3 Sheets. Sheet 1.

C. G. Murch,
Coffee Pot.

No. 82,976. Patented Oct. 13, 1868.

Witnesses,
G. G. Bellows
O. P. Abercrombie

Inventor.
Chas. G. Murch

3 Sheets. Sheet 2.

C. G. Murch,
Coffee Pot.

No. 82,976.  Patented Oct. 13, 1868.

Witnesses,
Geo. G. Bellous
O. P. Abercrombie

Inventor.
Chas. G. Murch.

3 Sheets. Sheet. 3.

C. G. Munch,

Coffee Pot.

No. 82,976. Patented Oct. 13, 1868.

Witnesses,
Geo. Beller
O. P. Abercrombie

Inventor
Chas. G. Munch

United States Patent Office.

CHARLES G. MURCH, OF CHICAGO, ILLINOIS.

Letters Patent No. 82,976, dated October 13, 1868.

COFFEE AND TEA-STEAMER.

The Schedule referred to in these Letters Patent and making part of the same.

*To all whom it may concern:*

Be it known that I, CHARLES G. MURCH, of the city of Chicago, county of Cook, State of Illinois, have invented a new and improved Aroma-Saving Coffee and Tea-Condenser for making coffee and tea, by means of which the aroma is retained, and the full strength of the coffee and tea obtained; and I do hereby declare that the following is a full and exact description of my invention, reference being had to the accompanying drawings, and the letters of reference marked thereon.

Figure 1:
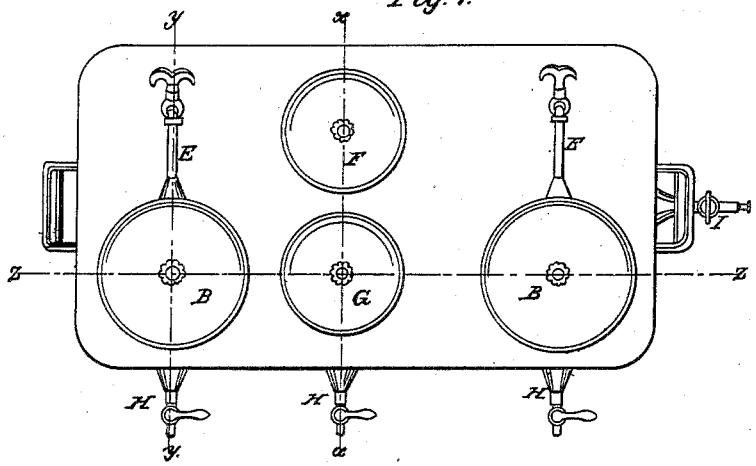
Figure 2:
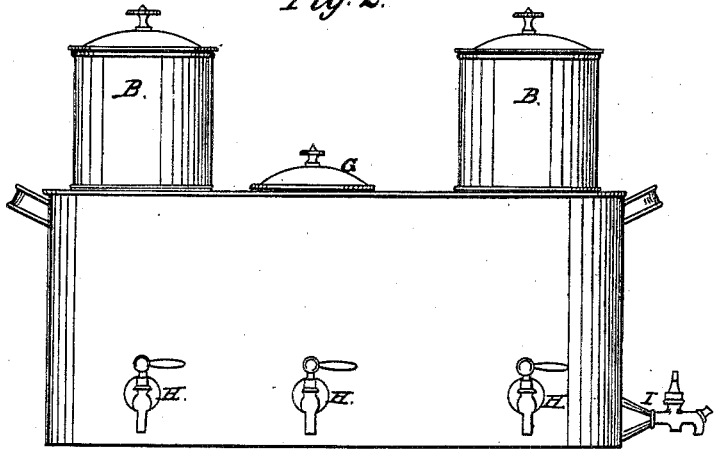
Figure 3:
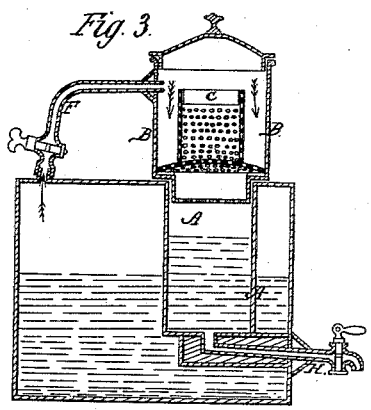
Figure 4:
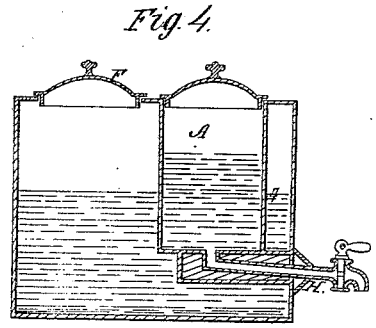
Figure 5:
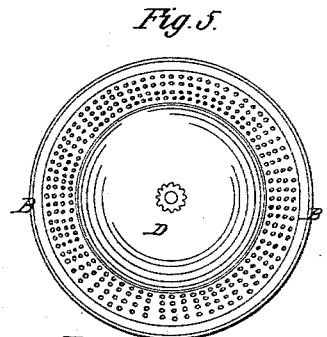
Figure 6:
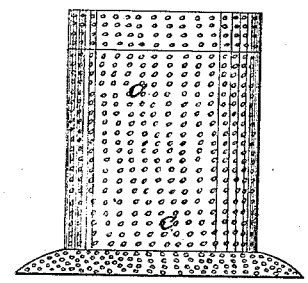
Figure 7:
Figure 8:
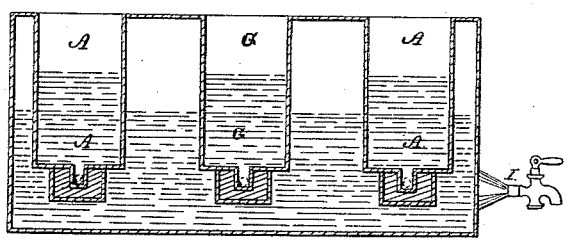
Figure 9:
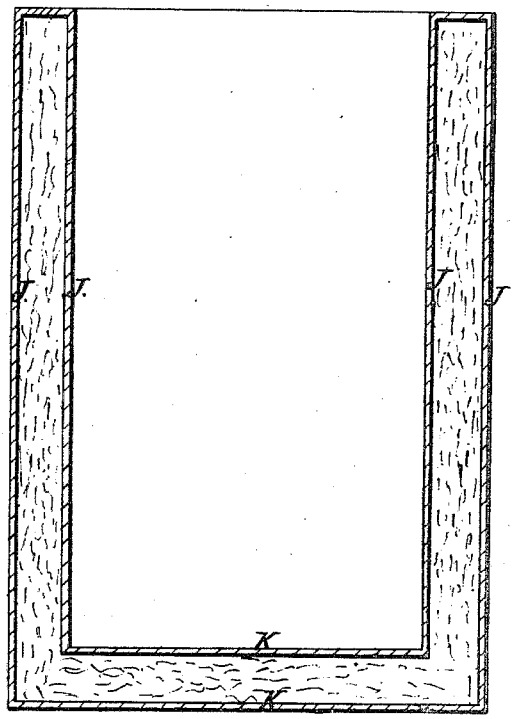

Figure 1 is a top view of my invention.
Figure 2 is a front view.
Figure 3 is a transverse section on line y y of fig. 1.
Figure 4 is a transverse section on line x x of fig. 1.
Figure 5 is the top of coffee-pot or tea-pot, strainer, and weight.
Figure 6 is a side view of strainer.
Figure 7 is side view of weight.
Figure 8 is longitudinal section on line z z of fig. 1.
Figure 9 shows a vertical section of the vessels A A; J J showing the outer and inner walls of the same, filled in between with pulverized charcoal or its equivalent. K K show the inner and outer bottoms, filled in between them with pulverized charcoal or its equivalent.

I construct a boiler or water-chamber of tin, or its equivalent, shown as in figs. 1 and 2. I place then, in openings at top of boiler or water-chamber, cylindrical vessels of tin, or its equivalent, A A, the tops of which are turned over about one-half an inch, and soldered or fastened so as to be secure; these vessels being made with an inner and outer wall, filled in between them with pulverized charcoal, or its equivalent, in order to prevent the passage of heat from the hot water in the water-chamber or boiler with which the cylindrical vessels are surrounded, and to prevent the escape of heat from the hot coffee or tea which may be in them. These vessels do not touch the bottom of the boiler or water-chamber, but a space between the bottom of the vessel and water-chamber, of an inch or two inches, may be left, so that the water in the water-chamber or boiler may circulate and pass under the vessels.

These vessels have an inner and lower bottom, with a space between the two, of about an eighth of an inch, filled with the charcoal, or its equivalent, between them.

The inner bottom has a small hole or aperture in its centre, through which is placed a tube of tin or its equivalent, securely fastened, and connecting with the tube of the faucet, or its equivalent, which tube comes between the inner and lower bottom, so that the contents of the vessel may be drawn off. A A, in fig. 8, show these vessels. A, in fig. 3, shows one of these vessels; also, A in fig. 4.

J J, in fig. 9, show the outer and inner walls of the vessels A A, between which the pulverized charcoal, or its equivalent, is placed.

K K, in fig. 9, show the inner and outer bottom of vessels A A, between which the pulverized charcoal, or its equivalent, is placed.

I then take cylindrical vessels, made of tin or its equivalent, the bottoms of which are perforated, and so constructed that they fit closely into the vessels first described, setting in about an inch or an inch and a half.

B B, in fig. 2, show these vessels. B, in fig. 3, also shows one of these vessels.

In the last-mentioned vessels I place a strainer, as shown in fig. 6, and at C, in fig. 3, of perforated tin, or its equivalent, the whole being perforated, being finer for coffee and coarser for tea. In this strainer is placed the coffee or tea, with a weight upon it, D in fig. 5 being a top view of the weight. A cover fitting closely, is then placed on the vessel B. A pipe or tube with stop-cock is attached to each of the vessels, B B, and connected with the water-chamber or boiler as in fig. 3; E showing the pipe with stop-cock, and so attached that the same can be displaced if required. These pipes or tubes pass through the top of the water-chamber, so that steam may pass through them.

The boiler or water-chamber being then filled, not quite to the inner surface of the top of the water-chamber or boiler, with boiling water at an opening in top of water-chamber F, in fig. 1, showing the position of this opening, and the opening closed with a tight-fitting cover, the steam arising from the boiling water in the water-chamber or boiler forces itself through the pipes or tubes, the stop-cock being turned so as to admit its passage, and passes through the interstices in the strainer containing the coffee or tea, saturates it, and as the steam condenses, it percolates through the coffee or tea, and passes, through the perforations in the bottom of the strainer and the vessels B B, into the vessels A A. Hot water may be turned upon the tea or coffee, and the steam still being admitted, forces the water through the coffee or tea into the vessels A A. The weight, being a self-adjuster, acts with a sufficient resistance upon the rising of the tea and coffee in the strainers, so that it is constantly pressing upon it. The full strength of the coffee or tea is thus extracted, and the aroma preserved.

The charcoal being a non-conductor, prevents the boiling of the coffee or tea by the action of the hot water in the water-chamber around it, thus preventing the coffee or tea from boiling away, or the heat or aroma contained in the vessel from escaping.

Fig. 2 shows a front view of the whole, complete, with a vessel of tin, or its equivalent, of a single thickness, between the vessels A A, for the boiling of milk.

G, in fig. 8, shows the vessel for the boiling of milk.

The coffee, tea, and milk can then be drawn, as required, by means of the stop-cocks or faucets H H H.

I is a faucet in the boiler or water-chamber to draw off the water.

What I claim as my invention, and desire to secure by Letters Patent, is—

In a coffee or tea-apparatus, the inner vessels A A G, with the stop-cocks and the upper vessels B B, pipes E, and strainer C, the whole combined and arranged substantially as and for the purposes shown.

CHAS. G. MURCH.

Witnesses:
GEO. G. BELLOWS,
O. P. ABERCROMBIE.